June 13, 1950     K. M. KECK     2,511,590
GLARE SHIELD
Filed July 1, 1946
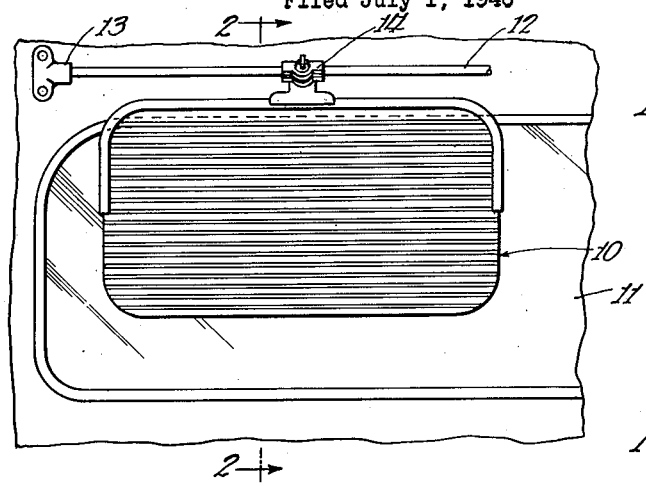
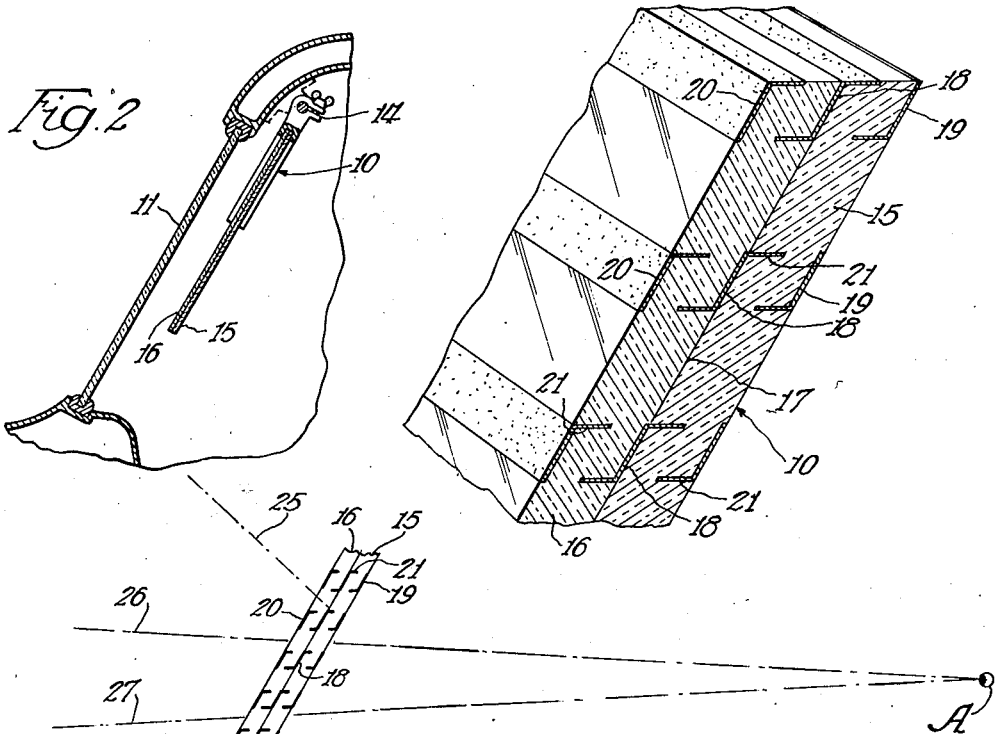
Inventor
Karl M. Keck
By: Zabel and Fritzbaugh
Attys Patented June 13, 1950

2,511,590

UNITED STATES PATENT OFFICE 2,511,590

GLARE SHIELD

Karl M. Keck, Delavan, Wis.

Application July 1, 1946, Serial No. 680,659

4 Claims. (Cl. 88—1)

The present invention relates to a glare interceptor or shield for use in vehicles such, for example, as automobiles, to eliminate some of the reflected light entering the windshield that produces glare. This is accomplished in an effective but inexpensive manner and through the invention will be illustrated in the form of a more or less portable visor it can also be embodied directly in the windshield or a window of the vehicle as will be explained.

Thus it is intended to provide a device that effectively reduces glare. The applications of the invention are many but it is particularly useful in an automobile, both in connection with the windshield and the rear window where glare is usually most objectionable.

Certain other objectives and advantages of the invention will be apparent from the following description and the drawings, in which Fig. 1 is a more or less diagrammatic fragmentary view of an automobile windshield illustrating one embodiment of the present invention;

Fig. 2 is a vertical, transverse sectional view through a portion of the windshield shown in Fig. 1 and illustrating the relationship between the windshield and the visor embodying the present invention, the view being taken on the line 2—2 of Fig. 1;

Fig. 3 is an enlarged perspective view illustrating a fragment only of the visor illustrated in Figs. 1 and 2; and Fig. 4 is a diagrammatic view illustrating the present invention as applied directly to the automobile windshield and the effectiveness of the invention in intercepting reflective light rays.

Referring to the drawings one form of the invention is illustrated as a movable visor 10 that is mounted directly over an automobile windshield 11 on a rod 12 that is fixed to the automobile body by means of brackets, one of which is shown at 13. A suitable clamping member 14 is employed to mount the visor 10 on the rod 12.

The visor 10 comprises preferably two or more sheets 15 and 16 of light transmitting material, such as glass or plastic that are arranged face to face so as to provide in effect an interface 17 therebetween. Disposed along the interface 17 are a plurality of spaced parallel bands 18 of a light absorbing material such, for example, as paint, ink, opaque silver or black, or hot pressed foil that is placed directly upon one of the meeting faces of the sheets 15 or 16. These bands 18 are spaced apart so as to provide areas between the bands through which light may be transmitted. On the outer exposed faces of the sheets 15 and 16 are similar bands 19 and 20 respectively that are arranged in parallel spaced relationship with respect to each other and with respect to bands 18.

As shown in Fig. 2 the windshield of an automobile is inclined from the vertical so that in normal use the visor 10 would likewise be inclined at substantially the same angle as the windshield 11. The bands 18, 19 and 20 (Fig. 3) are aligned so that their upper and lower edges lie in substantially horizontal parallel planes when the visor 10 is disposed in its operative position illustrated in Figs. 2 and 3.

Each of the faces of the sheets 15 and 16 is grooved to receive a band of light absorbing material indicated at 21 in Fig. 3. A saw cut may form each of these grooves and as noted each groove is disposed adjacent to one edge of a band 18, 19 or 20 and is disposed at such an angle with respect to the bands 18, 19 and 20 that when the visor 10 is in its operative position shown in Fig. 2, the bands 21 all lie in substantially horizontal planes. When the visor 10 is not in use it may be swung out of the way in the upper region of the car.

Instead of a separate visor the invention may be embodied directly into the body of the windshield as illustrated diagrammatically at 22 in Fig. 4. In this instance the windshield 22 comprises the pair of sheets 15 and 16 that are cemented or otherwise held in face to face relationship. The various bands 18, 19, 20 and 21 are provided directly on these sheets as previously explained, the bands all extending in a horizontal direction.

Fig. 4 is intended to illustrate diagrammatically the function of the present invention in eliminating glare. For this purpose it is assumed that a person is seated in the driver's seat of an automobile behind the wheel with his eye A disposed in the normal position with respect to the windshield 22. In the event a visor 10 is employed then the visor would be disposed in place of the windshield 22 illustrated in Fig. 4. It is readily apparent that light entering the automobile through the windshield 22 is limited to rather narrow bands. In other words, light reflected off the hood 23 of the automobile is illustrated by the line 24 and though this light is able to pass through the outer sheet 16 and the inner sheet 15 it is intercepted at B by one of the inner bands 19 of light absorbing material. Similarly, overhead glare from the sun or bright sky is illustrated by the line 25 that likewise is intercepted by one of the light absorbing bands 18, 19, 20 or 21. Lines 26 and 27 illustrate normal vision lines where light is free to pass through the windshield without interruption. These various bands, of course, must be spaced and arranged so as to be most effective in producing the particular condition desired. For example, a width for the bands 18, 19 and 20 of approximately one-sixteenth of an inch with a spacing between the bands 18 or 19 or 20 being approximately one-eighth of an inch is satisfactory. The particular number and arrangement of transverse bands 21 can be adjusted to meet the particular needs.

When the present invention is applied to the rear window of an automobile the amount of light entering through this window is reduced. This is helpful to reduce considerably the amount of glare from the rear view mirror that is normally mounted above the windshield.

Due to the reduction in the amount of light that passes through a window when the present invention is employed the amount of heat entering an automobile is likewise reduced. Thus the invention is effective in reducing the heat waves entering an automobile.

It is, of course, recognized that the invention may take other forms than those disclosed herein. For example, a sheet may be applied directly over the windshield or window with gaskets being provided to eliminate steaming and fogging between the sheet and the window.

I claim:

1. A glare interceptor of the class described comprising a plurality of sheets of light transparent material arranged face to face, and adapted to be adjusted into a position in front of an observer, for substantially straight-ahead vision, each face of each sheet being provided thereon with a plurality of spaced apart, relatively thin, parallel bands of opaque material disposed flat against the face, the bands on each face and interface being spaced to thereby provide a plurality of unobstructed viewing zones between the said bands, and the bands on all faces being aligned to the extent that the viewing zones are unobstructed throughout the composite thickness of the sheets, and additional relatively thin, parallel bands of opaque material disposed at an angle with respect to the first bands and extending from the face inwardly into the sheet, all of said bands extending in a substantially horizontal direction when the interceptor is in said adjusted position, whereby rays coming toward the interceptor at appreciable angles from above or below the straight-ahead vision will be prevented from striking the eyes of the observer.

2. A glare interceptor of the class described comprising a plurality of sheets of light transmitting material arranged face to face, and adapted to be adjusted into a position in front of an observer, for substantially straight-ahead vision, a plurality of the faces of the sheets being provided with spaced, relatively thin, parallel bands of light absorbing material disposed flat against the faces, the bands on each face and interface being spaced to thereby provide a plurality of unobstructed viewing zones between the said bands, and the bands on all faces being aligned to the extent that the viewing zones are unobstructed throughout the composite thickness of the sheets, and additional relatively thin, parallel bands of light absorbing material disposed adjacent to the first bands and extending from the faces into the sheets of the light transmitting material, all of said bands extending in a substantially horizontal direction when the interceptor is in said adjusted position, whereby rays coming toward the interceptor at appreciable angles from above or below the straight-ahead vision will be prevented from striking the eyes of the observer.

3. A glare interceptor of the class described comprising a pair of sheets of light transmitting material arranged face to face, and adapted to be adjusted into a position in front of an observer, for substantially straight-ahead vision, a plurality of spaced, relatively thin, parallel bands of light absorbing material disposed on and flat against the interface between the sheets, a plurality of similar bands disposed flat against the outer faces of the sheets, the bands on the three faces being in substantial alignment, the bands on each face and interface being spaced to thereby provide a plurality of unobstructed viewing zones between the said bands, and the bands on all faces being aligned to the extent that the viewing zones are unobstructed throughout the composite thickness of the sheets, and a plurality of additional relatively thin, parallel bands of light absorbing material disposed adjacent to the first bands and extending transversely into the sheets of light transmitting material, all of said bands extending in a substantially horizontal direction when the interceptor is in said adjusted position, whereby rays coming toward the interceptor at appreciable angles from above or below the straight-ahead vision will be prevented from striking the eyes of the observer.

4. A sheet of light transmitting material adapted to be adjusted in a position in front of an observer for substantially straight-ahead vision, having on a face thereof a plurality of spaced, relatively thin, parallel bands of light absorbing material disposed flat against the face, the bands being spaced apart to thereby provide a plurality of unobstructed viewing zones between the said bands, a groove adjacent to at least some of the edges of the bands and extending into the sheet, and a light absorbing material disposed in each groove so as to form additional bands disposed at an angle with respect to the first mentioned bands, all of said bands extending in a substantially horizontal direction when the interceptor is in said adjusted position, whereby rays coming toward the interceptor at appreciable angles from above or below the straight-ahead vision will be prevented from striking the eyes of the observer.

KARL M. KECK.

REFERENCES CITED

The following references are of record in the file of this patent:

UNITED STATES PATENTS

| Number | Name | Date |
|---|---|---|
| 693,088 | Wadsworth | Feb. 11, 1902 |
| 2,010,656 | Bernard | Aug. 6, 1935 |
| 2,053,173 | Astima | Sept. 1, 1936 |
| 2,053,220 | Howard | Sept. 1, 1936 |
| 2,074,247 | Armstrong | Mar. 16, 1937 |
| 2,322,591 | Papp | June 22, 1943 |

FOREIGN PATENTS

| Number | Country | Date |
|---|---|---|
| 11,054 | Great Britain | of 1908 |
| 233,484 | Great Britain | May 14, 1925 |
| 489,442 | Great Britain | July 26, 1938 |